United States Patent

Muenter

(10) Patent No.: US 9,006,304 B2
(45) Date of Patent: *Apr. 14, 2015

(54) AQUEOUS POLYURETHANE-POLYUREA DISPERSIONS

(75) Inventor: Juergen Muenter, Fellbach (DE)

(73) Assignee: Stahl International B.V., Waalwijk (NL)

( * ) Notice: Subject to any disclaimer, the term of this patent is extended or adjusted under 35 U.S.C. 154(b) by 173 days.

This patent is subject to a terminal disclaimer.

(21) Appl. No.: 12/993,708

(22) PCT Filed: May 19, 2009

(86) PCT No.: PCT/EP2009/056057
§ 371 (c)(1),
(2), (4) Date: Nov. 19, 2010

(87) PCT Pub. No.: WO2009/144157
PCT Pub. Date: Dec. 3, 2009

(65) Prior Publication Data
US 2011/0091712 A1    Apr. 21, 2011

(51) Int. Cl.
| | | |
|---|---|---|
| C08G 18/28 | (2006.01) | |
| C08G 18/08 | (2006.01) | |
| C08G 18/12 | (2006.01) | |
| C08G 18/32 | (2006.01) | |
| C08G 18/42 | (2006.01) | |
| C08G 18/44 | (2006.01) | |
| C08G 18/48 | (2006.01) | |
| C08G 18/65 | (2006.01) | |

(52) U.S. Cl.
CPC ........ *C08G 18/0823* (2013.01); *C08G 18/0866* (2013.01); *C08G 18/12* (2013.01); *C08G 18/282* (2013.01); *C08G 18/283* (2013.01); *C08G 18/3231* (2013.01); *C08G 18/4238* (2013.01); *C08G 18/44* (2013.01); *C08G 18/4854* (2013.01); *C08G 18/6505* (2013.01)

(58) Field of Classification Search
CPC ............... C08G 18/12; C08G 18/3225; C08G 18/3231; C08G 18/0823; C08G 18/0866; C08G 18/282; C08G 18/283; C08G 18/4238; C08G 18/48; C08G 18/6505
USPC ............... 524/589, 590, 591, 839; 428/423.1, 428/423.4; 521/159, 163, 164, 170, 174; 106/122, 287.25
See application file for complete search history.

(56) References Cited

U.S. PATENT DOCUMENTS

| | | | |
|---|---|---|---|
| 5,990,245 A | 11/1999 | Esselborn et al. | |
| 6,271,276 B1 * | 8/2001 | Gribble et al. | 521/133 |
| 6,303,665 B1 | 10/2001 | Helber et al. | |
| 6,586,523 B1 * | 7/2003 | Blum et al. | 524/840 |
| 6,642,303 B2 | 11/2003 | Schutze et al. | |
| 2003/0105219 A1 * | 6/2003 | Schutze et al. | 524/589 |
| 2004/0231561 A1 | 11/2004 | Kaul et al. | |
| 2005/0159575 A1 | 7/2005 | Rische et al. | |
| 2006/0237682 A1 | 10/2006 | Rische et al. | |
| 2009/0318634 A1 | 12/2009 | Muenter | |

FOREIGN PATENT DOCUMENTS

| | | |
|---|---|---|
| DE | 4430997 | 3/1994 |
| DE | 19914882 | 10/2000 |
| DE | 102004002526 | 8/2005 |
| DE | 102006036220 | 2/2008 |
| EP | 0507173 | 10/1992 |
| EP | 0622378 | 11/1994 |
| JP | 3-281620 | * 12/1991 |
| WO | WO 00/39178 | 7/2000 |
| WO | WO 02/090413 | 11/2002 |
| WO | WO 2006/111287 | 10/2006 |

OTHER PUBLICATIONS

PCT International Search Report for PCT/EP2009/056057, mailed Aug. 21, 2009.
PCT International Preliminary Report on Patentability for PCT/EP2009/056057, mailed Aug. 24, 2010.
"Alkenes"; IUPAC: Compendium of Chemical Technology, $2^{nd}$ ed. Complied by McNaught et al. Blackwell Scientific Pub online corrected version: http:/goldbook.iupac.com (2006) updated Aug. 19, 2012, ISPN 0-9678550.
"Alkyl Groups"; IUPAC: Compendium of Chemical Technology, $2^{nd}$ ed. Complied by McNaught et al. Blackwell Scientific Pub online corrected version: http:/goldbook.iupac.com (2006) updated Aug. 19, 2012, ISPN 0-9678550.
Adam et al., "Polyurethanes", Ullmanns Encyclopedia of Industrial Chemistry, Wiley-VCH Verlag GmbH & Co. KGaA, Weinheim pp. 545-604 (2012).
Dieterich, "Aqueous Emulsions, Dispersions & Solutions of Polyurethanes; Synthesis and Properties", Progress in Organic Coatings, Elseivier Sequoia S.A. Lausanne pp. 281-340 (1981).

* cited by examiner

*Primary Examiner* — John Cooney

(74) *Attorney, Agent, or Firm* — Peacock Myers, P.C.; Jeffrey D. Myers

(57) ABSTRACT

The present invention relates to aqueous polyurethane-polyurea dispersions which stabilize a foam—produced by mechanical expansion—without addition of further foam-stabilizing components in such a way that aqueous foams are obtainable which are stable both during temporary storage and during processing, so that they can be applied in the form of foam also by customary application methods and substantially retain the foam structure even after drying.

19 Claims, No Drawings ial composition, stabilise an application-resistant foam—produced by a mechanical expansion—in such a way that the addition of additional foam stabilisers is not required when they are used in foam coatings.

AQUEOUS POLYURETHANE-POLYUREA DISPERSIONS

The present invention relates to aqueous polyurethane-polyurea dispersions which, owing to their special chemical composition, stabilise an application-resistant foam—produced by a mechanical expansion—in such a way that the addition of additional foam stabilisers is not required when they are used in foam coatings.

The preparation of aqueous polyurethane-polyurea dispersions by means of the prepolymer ionomer process or the acetone process has long been known, for example from Prog. Org. Coat. 9 (1981) 281-340. Here, a prepolymer containing isocyanate groups is prepared in the absence of a solvent or in solution and optionally dissolved in solvents after carrying out the reaction. Thereafter, the prepolymer or the prepolymer solution is dispersed in water and a chain extension reaction is carried out with polyamines. The extension reaction can be effected partly or completely before the dispersing. Finally, the solvent is optionally distilled off.

The manner in which fine foam structures which are stable during temporary storage, processing and application by means of customary application methods, such as, for example, spray application or application by means of rolls or knife coaters, can be produced from polyurethane-polyurea dispersions by means of mechanical expansion is likewise known (DE 4 230 997 A1).

For the production of such foams, it has to date been necessary to add foam-stabilising compounds, for example in the form of low molecular weight surfactants, to the mixture. These foam stabilisers are not part of the binder matrix of a corresponding substrate coating and are therefore potentially able to migrate, which may lead to undesired effects on the surface, for example regarding optical properties, haptic properties or oversprayability.

There was therefore the need to be able to produce stable foams—produced by means of mechanical expansion—without addition of foam stabilisers potentially capable of migration.

It has now surprisingly been found that, with the use of the components stated below, it is possible to prepare aqueous polyurethane-polyurea dispersions which stabilise the foam—produced by mechanical expansion—without addition of further foam-stabilising components, in such a way that aqueous foams are obtainable which are stable both during temporary storage and during processing so that they can be applied in the form of foam by customary application methods, and the foam structure is substantially retained even after drying.

In this invention any alkenyl group may contain one or more double bonds unless otherwise described.

The invention therefore relates to a process for the preparation of foam-stabilising aqueous polyurethane-polyurea dispersions, in which A) first a polyurethane prepolymer containing NCO groups—having an NCO functionality of more than one and less than two—is prepared by reacting
  A1) polyisocyanates with
  A2) polymeric polyols and/or polyamines having number average molecular weights of 400 to 8000 g/mol,
  A3) isocyanate-reactive, non-ionically hydrophilising compounds,
  A4) isocyanate-reactive compounds containing $C_{7-24}$-alkyl or $C_{7-24}$-alkenyl groups,
  A5) optionally low molecular weight compounds having number average molecular weights of 17-400 g/mol, selected from the group consisting of mono- and polyalcohols, mono- and polyamines and amino alcohols,
  A6) optionally isocyanate-reactive, ionically or potentially ionically hydrophilising compounds,
  A7) optionally the reaction of A1) with A2) to A4) and/or A5) and/or A6) is carried out in aliphatic ketones or esters as solvents,
B) the still free NCO groups of the prepolymer are reacted with a compound A8), which is selected from the group consisting of isocyanate-reactive amino alcohols, monoamines, polyamines, hydrazine, hydrazides and mixtures thereof, in an amount such that a theoretical molar ratio of the isocyanate-reactive NH groups of the compound A8) to the NCO groups of the prepolymer of from 0.8 to 1.2 is achieved,
C) either the prepolymer obtained from step A) optionally being dissolved in aliphatic ketones or esters or, if the preparation was carried out in the presence of A7), the prepolymer solution optionally being diluted by further addition of aliphatic ketones or esters.

What is essential to the invention is the combined use of nonionically hydrophilising compounds according to A3) and compounds containing aliphatic groups, according to A4), at least one compound according to A3) and/or A4) which is monofunctionally reactive towards isocyanate being used, so that the resulting prepolymer has a theoretical NCO functionality which is smaller than two, preferably greater than one and less than two, more preferably greater than 1.0 and less than 2.0, even more preferably greater than 1.50 and less than 2.00, especially greater than 1.750 and less than 2.000.

For the purpose of the invention, the average functionality of all monomers $f_{av}$ is calculated by the formula:

$$f_{av} = \frac{\sum n_i \cdot f_i}{\sum n_i}$$

wherein $n_i$ is the molar amount of compound i and $f_i$ is the NCO-functionality or isocyanate-reactive functionality of compound i respectively. All compounds used in the prepolymer synthesis have to be considered in this calculation. An additional condition is that $\Sigma n_i \cdot f_i$ for the NCO compounds has to be greater than for the isocyanate-reactive compounds in order to achieve a NCO-terminated prepolymer.

For the purpose of the invention, for the calculation of the functionality of the prepolymer, this formula of the average functionality of all monomers is used as a first approximation. $f_{av}$ has to be smaller than two to get a prepolymer functionality also smaller than two.

The process is preferably carried out without the use of solvents according to A7) and C).

The invention furthermore relates to aqueous polyurethane-polyurea dispersions obtainable by the above process which stabilise an application-stable foam.

The invention furthermore relates to foams produced by means of mechanical expansion and comprising abovementioned polyurethane-polyurea dispersions and optionally mixtures thereof with other coating components, with the use of which in foam coatings the addition of additional foam stabilisers is possible but is not required according to the invention.

Suitable polyisocyanates according to A1) have the formula $X(NCO)_p$, in which p is a number from 1 to 4, preferably from 2 to 3, particularly preferably 2, and X is an aliphatic or cycloaliphatic, aromatic or araliphatic hydrocarbon radical. Preferably, X represents an aliphatic hydrocarbon radical having 3 to 20 carbon atoms, a cycloaliphatic or aromatic hydrocarbon radical having 5 to 15 carbon atoms or an araliphatic hydrocarbon radical having 6 to 15 carbon atoms.

In case that p is 2, the functionality of the prepolymer is calculated by the formula:

$$f_{Pre} = 2 - \frac{\sum n_{monoXH} - \sum \{(f_{polyXH} - 2) \cdot n_{polyXH}\}}{\sum n_{NCO} - \sum n_{biXH} - \sum n_{polyXH}}$$

wherein
$f_{Pre}$ is the functionality of the prepolymer
$f_{polyXH}$ is the functionality of the isocyanate-reactive compounds with more than two functionalities
$n_{monoXH}$ is the molar amount of monofunctional isocyanate-reactive compounds
$n_{biXH}$ is the molar amount of bifunctional isocyanate-reactive compounds
$n_{polyXH}$ is the molar amount of isocyanate-reactive compounds with more than two functionalities
$n_{NCO}$ is the molar amount of isocyanate compounds Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of 4,4'-diisocyanatodicyclohexylmethane, such as the trans/trans-, the cis/cis- and the cis/trans-isomers and mixtures consisting of these compounds.

Polymeric polyols or polyamines according to A2) typically originate from the group consisting of the polycarbonates, polyesters, polyethers, polyacrylates, polyolefins and polysiloxanes, as known, for example, from Ullmann's Encyclopedia of Industrial Chemistry 2005, DOI: 10.1002/14356007.a21_665.pub2 "Polyurethane", chapter 3, W. Friederichs.

Suitable polycarbonate polyols are those as can be obtained, for example, by reacting phosgene with an excess of polyhydric alcohols. Suitable dihydric alcohols are, for example, ethylene glycol, propane-1,2-diol, propane-1,3-diol, butane-1,3-diol, butene-1,4-diol, butyne-1,4-diol, pentane-1,5-diol, neopentyl glycol, 2-butyl-2-ethyl-1,3-propanediol, bis(hydroxymethyl)cyclohexanes, such as 1,4-bis(hydroxymethyl)cyclohexane, 2-methylpropane-1,3-diol, methylpentanediols, and furthermore diethylene glycol, triethylene glycol, tetraethylene glycol, polyethylene glycol, dipropylene glycol, polypropylene glycol, dibutylene glycol and polybutylene glycols.

Alcohols of the general formula HO—$(CH_2)_x$—OH, in which x is a number from 1 to 20, preferably an even number from 2 to 20, are preferred. Examples of these are ethylene glycol, butane-1,4-diol, hexane-1,6-diol, octane-1,8-diol and dodecane-1,12-diol. Neopentylglycol and 2-butyl-2-ethyl-1,3-propanediol are furthermore preferred. Higher-hydric alcohols, such as, for example glycerol, trimethylolpropane, 1,2,6-hexanetriol, 1,2,4-butanetriol, pentaerythritol, quinitol, mannitol and sorbitol, can also be used proportionately.

Other suitable polyester polyols are those which are obtained by reacting polyhydric alcohols with polybasic carboxylic acids. Instead of the free polycarboxylic acids, it is also possible to use the corresponding polycarboxylic anhydrides or corresponding polycarboxylic esters of lower alcohols or mixtures thereof for the preparation of the polyester polyols. The polycarboxylic acids may be aliphatic or cycloaliphatic, araliphatic, aromatic or heterocyclic and may be optionally substituted, for example by halogen atoms and/or unsaturated. The following may be mentioned as examples of these: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids. Dicarboxylic acids of the general formula HOOC—$(CH_2)_y$—COOH, in which y is a number from 1 to 20, preferably an even number from 2 to 20, e.g. succinic acid, adipic acid, sebacic acid and dodecanedicarboxylic acid, are preferred. Suitable polyhydric alcohols, preferably diols, are the low molecular weight alcohols mentioned as components for the polycarbonate polyols.

Lactone-based polyesterdiols are also suitable, these being homo- or copolymers of lactones, preferably adducts of lactones with suitable polyfunctional initiator molecules, which adducts have terminal hydroxyl groups. Preferred lactones are those which are derived from compounds of the general formula HO—$(CH_2)_z$—COOH, in which z is a number from 1 to 20 and an H atom of a methylene unit may also be substituted by a $C_1$- to $C_4$-alkyl radical. Examples are ε-caprolactone, β-propiolactone, γ-butyrolactone and/or methyl-ε-caprolactone and mixtures thereof. Suitable initiator components are, for example, the low molecular weight polyhydric alcohols mentioned above as a component for the polycarbonatepolyols. The corresponding polymers of ε-caprolactone are particularly preferred. Lower polyesterdiols or polyetherdiols may also be used as initiators for the preparation of the lactone polymers. Instead of the polymers of lactones, it is also possible to use the corresponding, chemically equivalent polycondensates of the hydroxycarboxylic acids corresponding to the lactones.

In addition, polyetherdiols are suitable as monomers. They are obtainable in particular by polymerisation of ethylene oxide, propylene oxide, butylene oxide, tetrahydrofuran, styrene oxide, epichlorohydrin or partly fluorinated or perfluorinated derivatives of these compounds with themselves, for example in the presence of $BF_3$, or by an addition reaction of these compounds, optionally as a mixture or in succession, with initiator components having reactive hydrogen atoms, such as alcohols or amines, e.g. water, ethylene glycol, propane-1,2-diol, propane-1,3-diol, 1,2-bis(4-hydroxydiphenyl)propane or aniline.

Also suitable are polyhydroxyolefins, preferably those having 2 terminal hydroxyl groups, e.g. α-,ω-dihydroxypolybutadiene, α-,ω-dihydroxypolymethacrylic esters or α-,ω-dihydroxypolyacrylic esters, as monomers. Such compounds are disclosed, for example, in EP 0 622 378 A1. Further suitable polyols are polyacetals, polysiloxanes and alkyd resins.

Nonionically hydrophilising compounds according to A3) are preferably polyoxyalkylene ethers which contain at least one hydroxyl or amino group. Suitable nonionically hydrophilising compounds are known to a person skilled in the art and are mentioned or explained in DE 10 2004 002 526 A1 in paragraphs [0035] to [0039] or in DE 10 2006 036220 A1.

Polyethylene glycol propylene glycol monoalkyl ethers and/or mixtures of polyethylene glycol monoalkyl ethers and polypropylene glycol monoalkyl ethers are more preferred.

Isocyanate-reactive compounds according to A4) containing $C_{7-24}$-alkyl or $C_{7-24}$-alkenyl groups are compounds which contain at least one isocyanate-reactive group—such as, for example, alcohol, amine or thiol—and at least one $C_{7-24}$-alkyl or $C_{7-24}$-alkenyl group. Preferably, A4) contains 1, 2, 3 or 4 isocyanate-reactive groups, more preferably 1 or 2 isocyanate-reactive groups. Preferably, A4) contains 1, 2, 3 or 4 $C_{7-24}$-alkyl or $C_{7-24}$-alkenyl groups, more preferably 1 or 2 $C_{7-24}$-alkyl or $C_{7-24}$-alkenyl groups. These include, for example, mono- or dialcohols, mono- or diamines and amino alcohols containing $C_{7-24}$-alkyl or $C_{7-24}$-alkenyl groups. They also include alkoxylation products of aliphatic carboxylic acids, carboxamides, phosphoric acid monoesters, phosphoric acid diesters, phosphonic acids, phosphonic acid monoesters, sulphuric acid monoesters, sulphonic acids, mono- or dialcohols, mono- or diamines or amino alcohols.

Monohydroxy, dihydroxy and monoamine compounds containing $C_{7-24}$-alkyl or $C_{7-24}$-alkenyl groups are preferably used.

The $C_{7-24}$-alkyl or $C_{7-24}$-alkenyl groups present are preferably straight-chain. Straight-chain alkyl groups having 11 to 22 carbon atoms are particularly preferred. Straight-chain alkyl groups having 15 to 20 carbon atoms are very particularly preferred.

Examples of compounds according to A4) are 1-octanol, 1-decanol, 1-dodecanol, 1-hexadecanol, 1-octadecanol, oleyl alcohol, 1-eicosanol and the alkoxylates thereof prepared by addition of, for example, ethylene oxide and/or propylene oxide. Alkoxylates having less than 9 alkoxy units are preferably used.

Further examples are 1-octylamine, 1-decylamine, 1-dodecylamine, 1-hexadecylamine, 1-octadecylamine, oleylamine, 1-eicosylamine and the alkoxylates thereof, prepared by addition of, for example, ethylene oxide and/or propylene oxide, it being possible for the amine nitrogen to be mono- and/or disubstituted by the alkoxylation. Alkoxylates having less than 13 alkoxy units are preferably used.

Compounds according to A4) may also be carboxylic acid alkoxylates or carboxamide alkoxylates, for example prepared from octanoic acid, decanoic acid, dodecanoic acid, hexadecanoic acid, octadecanoic acid, oleic acid, eicosanoic acid, octanamide, decanamide, dodecanamide, hexadecanamide, octadecanamide, oleamide or eicosanamide with, for example, ethylene oxide and/or propylene oxide. Alkoxylates having less than 10 alkoxy units are preferably used.

Other examples are alkoxylates of monoesters or diesters prepared from phosphoric acid or monoesters prepared from sulphuric acid and, for example 1-octanol, 1-decanol, 1-dodecanol, 1-hexadecanol, 1-octadecanol, oleyl alcohol, 1-eicosanol and an addition reaction of, for example, ethylene oxide and/or propylene oxide with these esters. Alkoxylates having less than 10 alkoxy units are preferably used.

Alkoxylated aliphatic phosphonic acids, phosphonic acid monoesters and sulphonic acids, the substituents of which on the phosphorus or sulphur as well as the ester groups may be, for example, 1-octyl, 1-decyl, 1-dodecyl, 1-hexadecyl, 1-octadecyl, oleyl or 1-eicosyl groups and the alkoxylation of which was carried out, for example, with ethylene oxide and/or propylene oxide, may furthermore be used. Alkoxylates having less than 10 alkoxy units are preferably used.

Monoethers—e.g. 1-octyl, 1-decyl, 1-dodecyl, 1-hexadecyl, 1-octadecyl, oleyl or 1-eicosyl ethers—of trifunctional alcohols, such as, for example, glycerol, trimethylolpropane, pyrogallol, phloroglucinol and 1,2,6-hexanetriol, and the alkoxylates prepared by an addition reaction of, for example, ethylene oxide and/or propylene oxide with these ethers are also possible. Alkoxylates having less than 10 alkoxy units are preferably used.

Monoesters—for example with octanoic acid, decanoic acid, dodecanoic acid, hexadecanoic acid, octadecanoic acid, oleic acid or eicosanoic acid—of trifunctional alcohols, such as, for example, glycerol, trimethylolpropane, pyrogallol, phloroglucinol and 1,2,6-hexanetriol, and the alkoxylates prepared by an addition reaction of, for example, ethylene oxide and/or propylene oxide with these esters may also be used. Alkoxylates having less than 10 alkoxy units are preferably used.

It is also possible to use dicarboxylic esters—e.g. with octanoic acid, decanoic acid, dodecanoic acid, hexadecanoic acid, octadecanoic acid, oleic acid or eicosanoic acid—of tetrafunctional alcohols, such as, for example, pentaerythritol, erythritol, threitol or diglycerol, and the alkoxylates prepared by an addition reaction of, for example, ethylene oxide and/or propylene oxide with these esters. Alkoxylates having less than 10 alkoxy units are preferably used.

Additional examples are diesters or diamides or dihydroxydicarboxylic acids, for example obtained from tartaric acid and 1-octanol, 1-decanol, 1-dodecanol, 1-hexadecanol, 1-octadecanol, oleyl alcohol, 1-eicosanol, 1-octylamine, 1-decylamine, 1-dodecylamine, 1-hexadecylamine, 1-octadecylamine, oleoylamine or 1-eicosylamine, and the alkoxylates prepared by an addition reaction of, for example, ethylene oxide and/or propylene oxide with these esters or amides. Alkoxylates having less than 10 alkoxy units are preferably used.

Suitable low molecular weight compounds according to A5) are the low molecular weight polyhydric alcohols, preferably diols and triols, mentioned above as a component for the polycarbonate polyols.

In addition, monoalcohols are also suitable, preferably primary or secondary alcohols, such as, for example, methanol, ethanol, propanol, isopropanol, 1-butanol, 2-butanol, isobutanol, 1-hexanol, 1-octanol, 2-ethylhexanol, 1-decanol, 1-dodecanol, 1-tetradecanol, 1-hexadecanol, 1-octadecanol and 1-eicosanol.

Amines or amino alcohols which are obtained, for example, by exchanging the alcohol groups of the alcohols mentioned in the last two paragraphs for amino groups or monoalkylamino groups are likewise suitable.

Ionically or potentially ionically hydrophilising compounds according to A6) are understood as meaning all compounds which have at least one group reactive towards isocyanate, preferably a hydroxyl or amino group, and at least one functionality which is ionic or potentially ionic. Examples of ionic and potentially ionic groups are —COOY, —$SO_3$Y, —PO(OY)$_2$ (Y for example=H, $NH_4^+$, metal cation), —$NR_2$, —$NR_3^+$ (R=H, alkyl, aryl). Suitable ionically or potentially ionically hydrophilising compounds are known to the person skilled in the art and are mentioned or explained, for example, in DE 10 2004 002 526 A1 in paragraph [0032].

Monofunctional compounds A8) for the extension reaction B) may be amino alcohols and monoamines as mentioned under A5), preferably amino alcohols or long-chain monoamines, such as, for example, ethanolamine, diethanolamine, 1-hexylamine, 1-octylamine, 1-decylamine, 1-dodecylamine, 1-tetradecylamine, 1-hexadecylamine, 1-octadecylamine, 1-eicosylamine. Polyamines which may be used are, for example, ethylenediamine, 1,2- and 1,3-diaminopropane, 1,4-diaminobutane, 1,6-diaminohexane, isophoronediamine, the isomer mixture of 2,2,4- and 2,4,4-trimethylhexamethylenediamine, 2-methyl-pentamethylenediamine, piperazine, 2,5-dimethylpiperazine, 4,4'-diaminocyclohexylmethane, 1,4-diaminocyclohexane, aminoethylethanolamine, aminopropylethanolamine, sodium (2-aminoethyl)-2-aminoethylsulphonate, diethylenetriamine, triethylenetetramine, tetraethylenepentamine, 1,3- and 1,4-xylylenediamine, $\alpha,\alpha,\alpha',\alpha'$-tetramethyl-1,3- and 1,4-xylylenediamine and 4,4'-diaminodicyclohexylmethane, dimethylethylenediamine;

and compound A8) may also be hydrazine, adipic acid dihydrazide or oxalic acid dihydrazide.

In the process according to the invention, preferably 10 to 45% by weight of component A1), 30 to 80% by weight of component A2), 0.1 to 15% by weight of component A3), 0.1 to 15% by weight of component A4), 0 to 8% by weight of component A5) and 0 to 10% by weight of component A6) are used for the preparation of the polyurethane prepolymer containing NCO groups, the sum of all components being 100% by weight.

The process according to the invention for the preparation of the aqueous PUR dispersions can be carried out in one or more stages in the homogeneous phase or—in the case of a multistage reaction—partly in the disperse phase. After polyaddition of A1)-A6) has been completely or partly carried out, a dispersing, emulsification or dissolution step is effected. This is optionally followed by a further polyaddition or modification in the disperse phase.

In the process according to the invention, the catalysts known for accelerating the isocyanate addition reaction, such as, for example, triethylamine, 1,4-diazabicyclo[2.2.2]octane, dibutyltin oxide, tin dioctanoate or dibutyltin dilaurate, tin bis(2-ethylhexanoate) or other organometallic compounds, can be initially introduced or metered in subsequently.

The constituents of A1)-A7) which may not yet have been added at the beginning of the reaction are then metered in.

In the preparation of the polyurethane prepolymer in step A), the molar ratio of isocyanate groups to groups reactive with isocyanate is from 1.0 to 3.5 and preferably from 1.2 to 2.7.

The reaction of the components A1)-A6) to give the prepolymer is effected partly or completely, but preferably completely. The conversion is usually monitored by monitoring the NCO content of the reaction mixture. For this purpose, both spectroscopic measurements, e.g. infrared or near infrared spectra, determinations of the refractive index and chemical analyses, such as titrations, of samples taken are carried out. Polyurethane prepolymers which contain free isocyanate groups are thus obtained as such or in solution.

After or during the preparation of the polyurethane prepolymers from A1) to A6), partial or complete salt formation of the groups having an anionically and/or cationically dispersing effect is effected unless this was carried out in the starting molecules. In the case of anionic groups, bases, such as ammonia, ammonium carbonate or bicarbonate, trimethylamine, triethylamine, tributylamine, diisopropylethylamine, dimethylethanolamine, diethylethanolamine, triethanolamine, potassium hydroxide or sodium carbonate, are used for this purpose, preferably triethylamine, triethanolamine, dimethylethanolamine or diisopropylethylamine. The molar amount of the bases is between 50 and 150% and preferably between 85 and 120% of the amount of the anionic groups. In the case of cationic groups, for example, dimethyl sulphate, succinic acid or formic acid is used. If only nonionically hydrophilised compounds A3) having ether groups are used, the neutralisation step is omitted. The neutralisation can also be effected simultaneously with the dispersing if the dispersing water already contains the neutralising agent.

Thereafter, it is possible to dissolve the resulting prepolymer with the aid of the solvent according to A7) in a further process step C).

In the following process step, the compounds A8) from B) are reacted with the isocyanate groups still remaining. This chain extension/termination can be carried out either in a solvent prior to the dispersing, during the dispersing or preferably in water after the dispersing.

The degree of chain extension, i.e. the ratio of the number of equivalents of the newly added reactive NH groups of the compounds A8) used for the chain extension in B) to free NCO groups of the prepolymer, is preferably of from 0.80 to 1.20, more preferably of from 0.85 to 1.00, even more preferably of from 0.90 to 0.98.

The compounds A8) of step B) can be used individually or as mixtures, optionally diluted with water and/or with the solvent according to A7), in the process according to the invention, in principle any sequence of addition being possible.

Usually, the preparation of the polyurethane-polyurea dispersions according to the invention is effected by either introducing the solvent-free or dissolved prepolymer or the chain-extended polyurethane polymer, optionally with strong shearing, such as, for example, vigorous stirring, into the dispersing water or, conversely, stirring the dispersing water into the prepolymer or polymer or the solutions thereof. The solvent-free prepolymer is preferably added to the water.

The solvent A7) which may still be present in the dispersions after the dispersing step is usually subsequently removed by distillation. The distillation is preferably carried out under reduced pressure. Removal during the dispersing itself is also possible.

The dispersions thus obtained have a solids content of 10 to 70% by weight, preferably 20 to 65% by weight and particularly preferably 25 to 60% by weight.

Depending on the degree of neutralisation and content of ionic groups, the dispersion may be made very finely divided so that it virtually has the appearance of a solution, but very coarse-particled formulations, which are likewise sufficiently stable, are also possible.

The invention furthermore relates to mixtures of the polyurethane-polyurea dispersions according to the invention with other aqueous binders and crosslinking agents, which are used for the preparation of coating materials. Here, the auxiliaries and additives known per se from coating technology, such as, for example, thickeners, fillers, pigments, waxes, hand agents, dyes, solvents, levelling agents and crosslinking agents, can also be used.

The invention also relates to coatings of the polyurethane-polyurea dispersions according to the invention and/or of the abovementioned mixtures thereof and/or preferably foams produced therefrom—by means of mechanical expansion—on any desired substrates, such as, for example, metal, wood, glass, glass fibres, carbon fibres, stone, ceramic minerals, concrete, rigid and flexible plastics of a very wide range of types, woven and nonwoven textiles, leather, split leather, imitation leather, paper, hard fibres, straw and bitumen, which can optionally also be provided with customary primer coatings prior to the coating or optionally with further coatings after the coating.

Preferred substrates are leather and imitation leather. Particularly preferred substrates are full-grain and buffed leather and split leather.

Therefore further subject of the invention are
aqueous polyurethane-polyurea dispersions obtainable by the described process;
the use of such aqueous polyurethane-polyurea dispersions for the production of coatings;
the use of such aqueous polyurethane-polyurea dispersions for the production of foams by mechanical expansion for the production of coatings;
coatings obtainable from such aqueous polyurethane-polyurea dispersions;

coatings obtainable from such foams by mechanical expansion, obtainable from such aqueous polyurethane-polyurea dispersions;
substrates coated with such coatings;
leather or imitation leather coated with such coatings;
full-grain or buffed leather and split leather coated with such coatings.

EXAMPLES

Assessment of the Foam Stability by Means of an Imhoff Funnel

The mechanically produced foam is adjusted to a foam density of 0.5 to 0.7 g/cm$^3$, one liter of this foam is introduced into an Imhoff funnel and the opening is covered. After one hour at room temperature, 100 ml are discharged and the density is determined. If the density has increased by not more than 10%, the foam stability is suitable for the application.

Assessment of the Foam Stability in the Application:

The mechanically produced foam is adjusted to a foam density of 0.5 to 0.7 g/cm$^3$ and applied to leather by means of spray application. A foam finish having good foam stability is distinguished by a level, visually uniform foam surface and a soft, full hand. In addition, a fine-pore foam should be visible in a cross section under an optical microscope.

Water Drop Test for Assessing the Migration:

A drop of demineralised water is placed on the applied and dried foam finish and is allowed to evaporate completely at room temperature. An undesired migration may manifest itself in the formation of a grey to white edge on drying of the drop. Even if this edge can be removed without problems, this effect is undesired.

Preparation (W4) and foam (S4) described in DE 4 230 997 A1 serve as Comparative Example 1.

Preparation (W4) and foam (S4) as described in DE 4 230 997 A1, with the difference that the foam stabiliser ammonium stearate is not used, serve as Comparative Example 2.

Used Materials

Component A3)

Polyglykol B01/20 of Clariant International Ltd: mono n-butyl ether of a polymer of propylene oxide with a molar mass of approximately 700 g/mol Polyglykol B11/50 of Clariant International Ltd: mono n-butyl ether of a statistical polymer of ethylene oxide and propylene oxide with a molar mass of approximately 1300 g/mol Polyglykol M750 of Clariant International Ltd: mono methyl ether of a polymer of ethylene oxide with a molar mass of approximately 750 g/mol Component A4)

Hostacerin DGSB of Clariant International Ltd: Diglycerol distearate ethoxylated with an average of four ethylene oxides Polyurethane Dispersions According to the Invention

PU-1:

727.8 g (360 mmol) Poly(hexamethylenglycol adipate) (OH No.=55.5), 87.4 g (100 mmol) of Hostacerin DGSB, 42.9 g (320 mmol) of dimethylolpropionic acid, 35 g (50 mmol) of Polyglykol B01/20 and 37.4 g (50 mmol) of Polyglykol M750 are initially introduced at 60° C. and 309.1 g (1840 mmol) of hexamethylene diisocyanate are added. The mixture is stirred for 1.5 h at about 85° C. The NCO value thereafter is 6.50% (theoretical NCO value: 6.84%). This prepolymer is cooled to 60° C. and 32.3 g (320 mmol) of triethylamine are then added. The mixture is now poured into 1930 g of cold water (5-10° C.) with vigorous stirring in the course of 10 min. and is stirred for a further 15 min. A solution of 42.9 g (857 mmol) of hydrazine monohydrate and 24 g (54 mmol) of an aqueous solution of 2-(2-Aminoethyl)-amino-1-ethanesulfonic acid sodium salt (Vestamin A 95 former Degussa AG) (amine No.=253) (corresponds altogether to 95% of the theoretically required amount of amine) in 320 g of water is added to this dispersion in the course of 10 min and stirring is effected for a further 15 min. A storage-stable dispersion having a solids content of 35% by weight is obtained.

PU-2:

288 g (140 mmol) of α,ω-dihydroxypoly(oxy-1,4-butane-diyl)(OH No.=54.4), 25.5 g (29.2 mmol) of Hostacerin DGSB, 12.5 g (93.1 mmol) of dimethylolpropionic acid and 59.5 g (45.8 mmol) of Polyglykol B11/50 are initially introduced at 60° C. and 144.3 g (650 mmol) of isophorone diisocyanate are added. The mixture is stirred for 2 h at about 85° C. The NCO value thereafter is 5.57% (theoretical NCO value: 5.79%). This prepolymer is cooled to 60° C. and 9.4 g (93.1 mmol) of triethylamine are then added. The mixture is now poured into 890 g of cold water (5-10° C.) with vigorous stirring in the course of 10 min and is stirred for a further 15 min. A solution of 16.7 g (334 mmol, 95% of the theoretically required amount) of hydrazine monohydrate in 60 g of water are added to this dispersion in the course of 10 min and stirring is effected for a further 15 min. A storage-stable dispersion having a solids content of 35% by weight is obtained.

PU-3:

192 g (95 mmol) of poly(hexamethyleneglycol carbonate) (OH No.=55.5), 9.5 g (35 mmol) of stearyl alcohol, 11.4 g (85 mmol) of dimethylolpropionic acid and 32.5 g (25 mmol) of polyglycol B11/50 are initially introduced at 65° C. and 117.9 g (450 mmol) of bis(4-isocyanatocyclohexyl)methane (Desmodur W former Bayer AG) are added. The mixture is stirred for 2.5 h at about 90° C. The NCO value thereafter is 5.32% (theoretical NCO value: 5.55%). This prepolymer is cooled to 65° C. and 9.1 g (90 mmol) of triethylamine are then added. The mixture is now poured into 650 g of cold water (5-10° C.) with vigorous stirring in the course of 10 min and is stirred for a further 15 min. A solution of 13.1 g (219 mmol, 95% of the theoretically required amount) of ethylenediamine in 100 g of water is added to this dispersion in the course of 10 min and stirring is effected for a further 15 min. A storage-stable dispersion having a solids content of 32% by weight is obtained.

Preparations analogous to the preparation (W4) in DE 4 230 997 A1 are mixed from the polyurethane dispersions PU-1 to PU-3 or mixtures thereof, with the difference that the foam stabiliser ammonium stearate is not used. This means that 1000 parts of the PU dispersion are mixed with 190 parts of a pigment preparation made into a paste with hydroxyethylcellulose, so that the mixture has a viscosity of 30 seconds, measured using a DIN Cup 4.

The production of the foams from these preparations is effected as described for foam (S4) in DE 4 230 997 A1.

The applications of the foams and of the remaining finish is effected as described in the application examples A to D in DE 4 230 997 A1.

Evaluation of the Results

All four application examples (analogous to application examples A to D of DE 4 230 997 A1) provide for the following results:

The foam stability of Comparative Example 1 and of the foams produced from the preparations of the dispersions PU-1 to PU-3 is good. The foam stability of Comparative Example 2 is not sufficient.

After the application of the foams and the drying, Comparative Example 1 and the foams produced from the preparations of the dispersions PU-1 to PU-3 have a uniform visual appearance, a soft hand and, in cross section under the microscope, a fine pore size. Applications of Comparative Example 2 show tears, a nonuniform visual appearance, a harder, less voluminous hand and, in cross section under the microscope, a very nonuniform pore size.

The water drop test shows a white to grey edge in the case of finishes comprising foams of Comparative Example 1. In the case of finishes comprising foams of Comparative Example 2 and foams produced from the preparations of the dispersions PU-1 to PU-3, this effect does not occur.

Therefore, PU1- to PU-3, contrary to comparative examples 1 and 2, perform in each of the four application examples satisfactorily.

The invention claimed is:

1. Process for the preparation of a foam-stabilising aqueous polyurethane-polyurea dispersion, comprising the steps of
   A) first a polyurethane prepolymer containing NCO groups—having an NCO functionality of less than two—is produced by reacting
      A1) polyisocyanates with
      A2) polymeric polyols, polyamines, or a mixture thereof, wherein the polymeric polyols, polyamines, or mixture thereof have number average molecular weights of 400 to 8000 g/mol,
      A3) isocyanate-reactive, non-ionically hydrophilising compounds which are polyoxyalkylene ethers which contain at least one hydroxyl or amino group,
      A4) isocyanate-reactive compounds containing $C_{7-24}$-alkyl or $C_{7-24}$-alkenyl groups, and having 2, 3, or 4 isocyanate-reactive groups, and
      A6) isocyanate-reactive, ionically or potentially ionically hydrophilising compounds,
   and
   B) the still free NCO groups of the prepolymer are reacted with a compound A8), wherein the compound A8) is selected from the group consisting of isocyanate-reactive amino alcohols, monoamines, polyamines, hydrazine, hydrazides and mixtures thereof, in an amount such that a theoretical ratio of the isocyanate-reactive NH groups of the compound A8) to the NCO groups of the prepolymer from 0.8 to 1.2 is achieved,
   wherein no foam-stabilizing additives are included in said dispersion.

2. Process according to claim 1, wherein the polyurethane prepolymer containing NCO groups has a NCO functionality of more than one and less than two.

3. Process according to claim 1 wherein, in step A), a reaction of A1) with
   A5) low molecular weight compounds having number average molecular weights of 17-400 g/mol, selected from the group consisting of mono- and polyalcohols, mono- and polyamines and amino alcohols, and/or wherein
   A7) in step A), the reaction of A1) with A2) to A4 and/or A5) and/or A6) takes place in aliphatic ketones or esters as solvents.

4. Process according to claim 3, wherein
   C) either the prepolymer obtained from step A) is dissolved in aliphatic ketones or esters or, if the preparation was carried out in the presence of A7), the prepolymer solution is diluted by further addition of aliphatic ketones or esters.

5. Process for the preparation of aqueous polyurethane-polyurea dispersions according to claim 1 wherein the polyurethane prepolymer containing NCO groups contains 10 to 45% by weight units of component A1), 30 to 80% by weight units of component A2), 0.1 to 15% by weight units of component A3) and 0.1 to 15% by weight units of component A4), the sum of all components units being 100% by weight.

6. Process according to claim 1, wherein the compounds according to A4) contain at least one straight, saturated alkyl chain of 11 to 22 carbon atoms.

7. Process according to claim 6, wherein the compounds according to A4) contain at least one straight, saturated alkyl chain of 15 to 20 carbon atoms.

8. Process according to claim 1, wherein the compounds according to A3) are polyethylene glycol propylene glycol monoalkyl ethers, mixtures of polyethylene glycol monoalkyl ethers and polypropylene glycol monoalkyl ethers or mixtures thereof.

9. Process according to claim 1, wherein the polyisocyanates A1) have the formula $X(NCO)_p$, in which p is 2, and X is an aliphatic or cycloaliphatic, aromatic or araliphatic hydrocarbon radical.

10. An aqueous foam-stabilising polyurethane-polyurea dispersion made by a process comprising the steps of
    A) first a polyurethane prepolymer containing NCO groups—having an NCO functionality of less than two—is produced by reacting
       A1) polyisocyanates with
       A2) polymeric polyols, polyamines, or a mixture thereof, wherein the polymeric polyols, polyamines, or mixture thereof have number average molecular weights of 400 to 8000 g/mol,
       A3) isocyanate-reactive, non-ionically hydrophilising compounds which are polyoxyalkylene ethers which contain at least one hydroxyl or amino group,
       A4) isocyanate-reactive compounds containing $C_{7-24}$-alkyl or $C_{7-24}$-alkenyl groups and having 2, 3, or 4 isocyanate-reactive groups, and
       A6) isocyanate-reactive, ionically or potentially ionically hydrophilising compounds
    and
    B) the still free NCO groups of the prepolymer are reacted with a compound A8), wherein the compound A8) is selected from the group consisting of isocyanate-reactive amino alcohols, monoamines, polyamines, hydrazine, hydrazides and mixtures thereof, in an amount such that a theoretical ratio of the isocyanate-reactive NH groups of the compound A8) to the NCO groups of the prepolymer from 0.8 to 1.2 is achieved,
    wherein no foam-stabilizing additives are included in said dispersion.

11. A coating made from an aqueous polyurethane-polyurea dispersion according to claim 10.

12. A coating produced from foam, wherein the foam is produced by mechanical expansion and wherein the foam comprises an aqueous polyurethane-polyurea dispersion according to claim 10.

13. The coating according to claim 11, wherein the aqueous polyurethane-polyurea dispersion is in the form of a foam and wherein the foam is created by mechanical expansion.

14. A substrate coated with a coating according to claim 11.

15. Leather or imitation leather coated with a coating according to claim 11.

16. Full-grain leather, buffed leather or split leather coated with a coating according to claim 11.

17. A substrate coated with a coating according to claim 13.

18. Leather or imitation leather coated with a coating according to claim 13.

19. Full-grain leather, buffed leather or split leather coated with a coating according to claim 13.

* * * * *